June 28, 1949.  N. L. COBB  2,474,393
METHOD OF GENERATING CLUTCH TEETH FOR
EXTENDED INTIMATE CONTACT
Filed April 17, 1942  3 Sheets-Sheet 1

Inventor
Neal L. Cobb
by Wright, Brown, Quimby
&Lacy Attys.

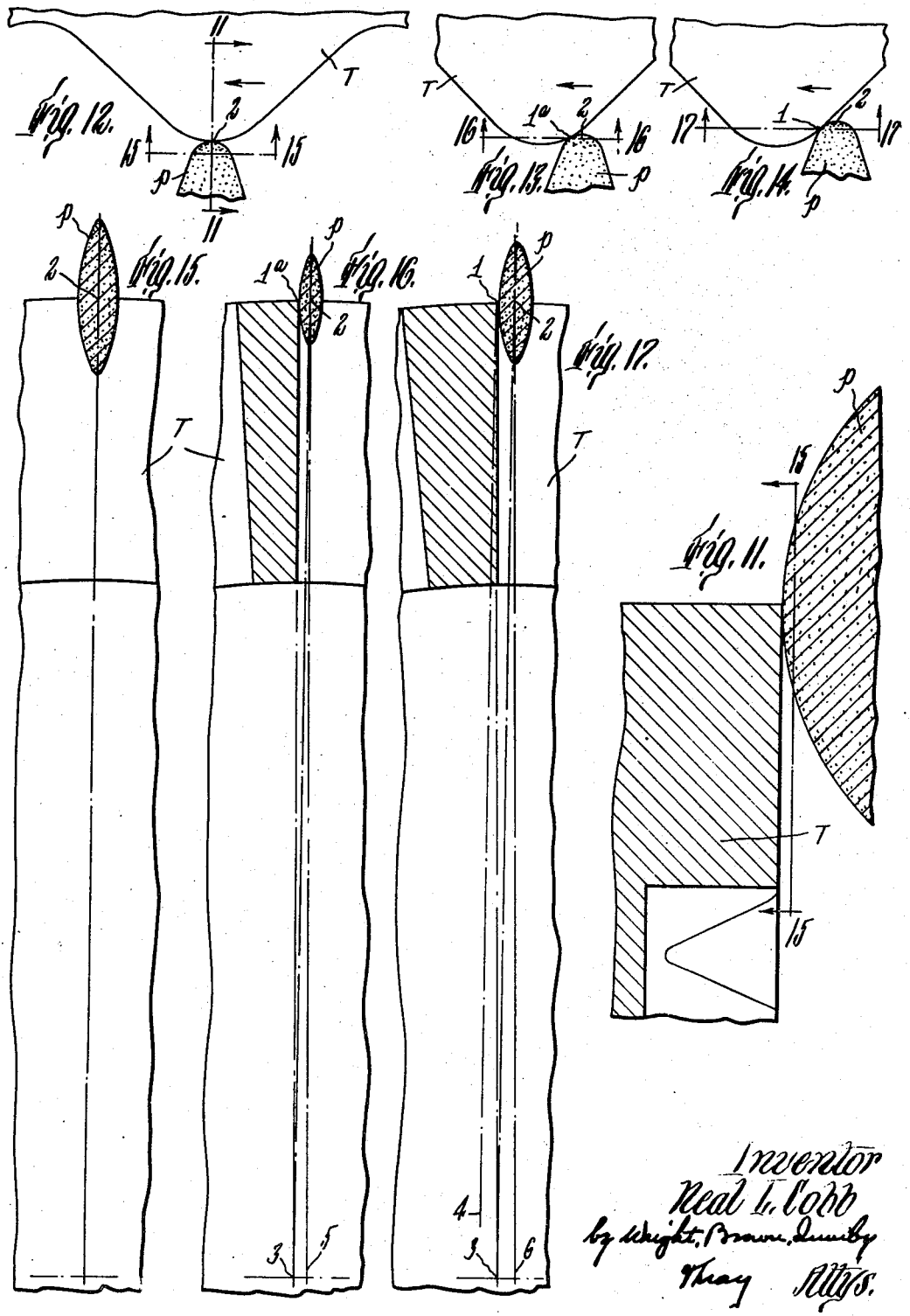

Inventor
Neal L. Cobb

Patented June 28, 1949

2,474,393

UNITED STATES PATENT OFFICE 2,474,393

METHOD OF GENERATING CLUTCH TEETH FOR EXTENDED INTIMATE CONTACT

Neal L. Cobb, Springfield, Vt., assignor to The Fellows Gear Shaper Company, Springfield, Vt., a corporation of Vermont Application April 17, 1942, Serial No. 439,358

3 Claims. (Cl. 90—8)

The present invention relates to face clutches of which the teeth of the cooperating clutch members make intimate contact throughout the entire areas of their complemental faces. Clutches of this type provide the maximum simultaneous pressure area for transmission of torque in both directions of rotation. The term "face clutch" implies that the teeth of each member are located in an end face of the member, or in other words in a plane transverse to the axis of the member, as distinguished from arrangement in an external or internal circumference. To effect the desired intimate contact, the faces of the clutch teeth are true warped or helicoidal surfaces of which the elements in planes perpendicular to the axis are straight radial lines, and the elements perpendicular to such radial elements are also straight lines and are inclined to planes perpendicular to the axis. Such inclinations may vary within wide limits according to the service and duty required of different clutches.

The methods heretofore used for producing clutches of this desirable type have been attended by serious difficulty in maintaining accurate control of the cutting tools and other operating parts. The expense and slow rate of so making them have hampered their commercial manufacture and prevented them from being produced in the desired quantities.

My object has been to enable such clutches to be produced, with the required accuracy, more rapidly and at lower cost than by previously known means and methods, and with elimination of the difficulties inherent in such methods. In the accomplishment of this object I have devised novel methods of operation, the principles and particulars of which are described in the following specification with reference to illustrative drawings.

The invention consists in the methods so described and all equivalent variations thereof.

In the drawings,

Fig. 1 is a side elevation of a face clutch of the intimate contact type previously referred to;

Figure 19:
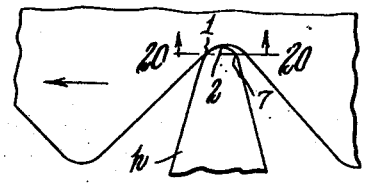
Figure 18:
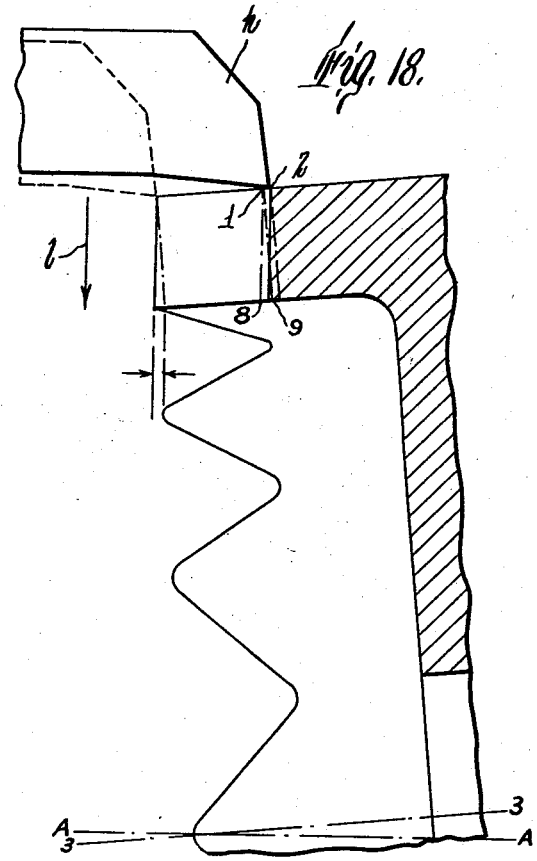
Figure 20:
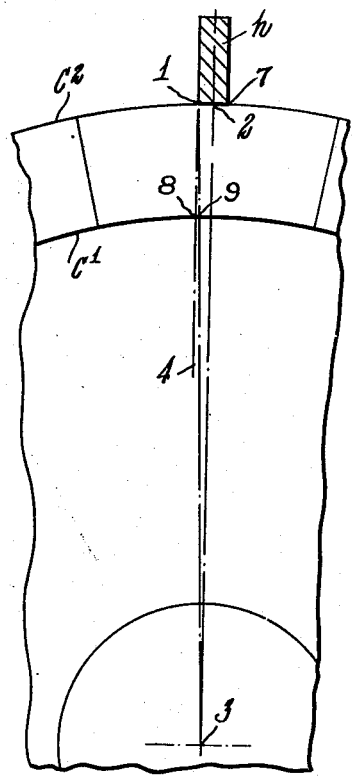
Figure 21:
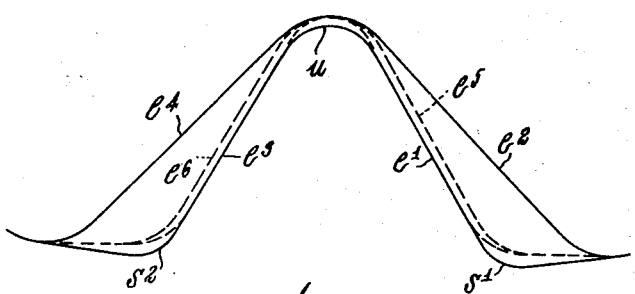

Figs. 5-10 inclusive are diagrams in plan view showing the relative positions of cutter and work at different stages in the generation of the contiguous parts of two adjacent teeth;

Figs. 11-17 inclusive illustrate the employment of a grinding wheel to accomplish the same results, and of these:

Fig. 11 is the radial median section of one of the clutch teeth and a central section of the adjacent rim of a grinding wheel in position to act on the crest of such tooth; said section being taken on the line 11—11 of Fig. 12;

Figs. 12, 13 and 14 are plan views showing the rim of the grinding wheel in contact, respectively, with the crest of the clutch tooth, and at successive points at one side of the crest;

Fig. 15 is a sectional elevation taken on line 15—15 of Figs. 11 and 12;

Fig. 16 is a similar section on line 16—16 of Fig. 13;

Fig. 17 is a similar section on line 17—17 of Fig. 14;

Fig. 18 is an axial section of a clutch and elevation of a planing cutter in relation for carrying out a variation of the methods illustrated in the preceding figures to accomplish the same results;

Fig. 19 is a fragmentary plan view of the cutter and clutch shown in Fig. 18;

Fig. 20 is a fragmentary face view of the same clutch showing the cutter in section on line 20—20 of Fig. 19;

Fig. 21 is a diagram illustrating the principles of this method variation.

Like reference characters designate the same parts wherever they occur in all the figures.

Figure 1:
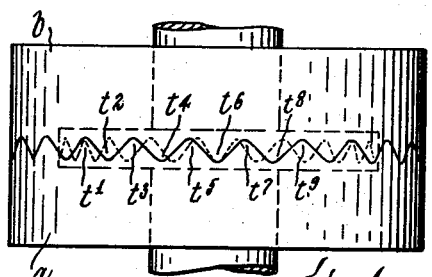
Figure 2:
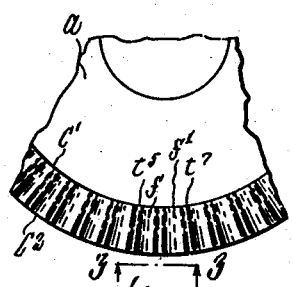
Fig. 2 is an end or face view of a fragment of one of the clutch members shown in Fig. 1.
Figure 3:
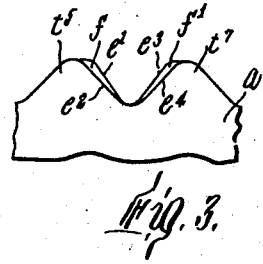
Fig. 3 is an elevation on a larger scale of two of the teeth and the space between them shown in the preceding figures, as viewed in the direction of the arrows applied to the line 3—3 of Fig. 2.
Figure 4:
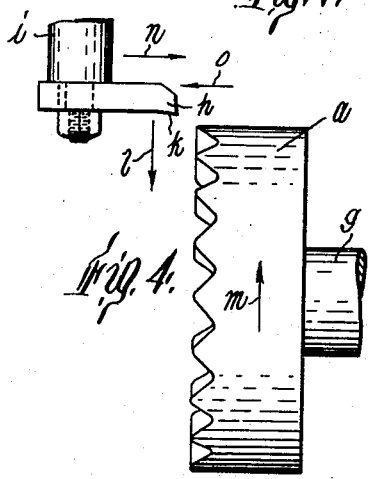
Fig. 4 is a side elevation of one of such elements and of a cutting tool in cooperative relation for generating the clutch teeth.

A clutch of the intimate contact type is shown in Figs. 1, 2 and 3. It consists of two cylindrical members $a$ and $b$, each having a coaxial annular rib on one face contiguous to its outer circumference, in which teeth are cut. The teeth of the member $a$ are designated $t'$, $t^3$, $t^5$, $t^7$, $t^9$, etc. and those of the member $b$ are designated $t^2$, $t^4$, $t^6$, $t^8$, etc. These teeth of both members are radial to the axis of the clutch, and all of their surface elements which lie in planes perpendicular to the axis are radial lines. In the axial direction of the clutch, the surface elements extending perpendicular to the said radial elements are substantially straight lines and are inclined with respect to the axis. The latter elements may be designated "axially extending elements" to distinguish them from the radial elements. Since the pitch of the teeth on the inside circumference $c'$ of the tooth bearing zone is shorter than the pitch on the outside circumference $c^2$, the slopes of the tooth faces are steeper at the inner than at the outer circumference. This fact is illustrated by Fig. 3, where $e'$ and $e^2$ designate the inner and outer axially extending elements bounding the face $f$ of tooth $t^5$, and $e^3$ and $e^4$ designate the corresponding elements bounding the face $f'$ of tooth $t^7$, at the opposite side of the intermediate tooth space. The intermediate axially extending elements have different degrees of inclination, between those of the elements above designated in proportion to their distance from the axis.

The teeth of clutch member $b$ are complemental to those of the member $a$, having equal degrees of slope at like distances from the axis, wherefore the teeth of each member fit the interdental spaces of the other member, and bear with intimate contact throughout the entire areas in common, or overlapping areas of their lateral faces.

The problem which I have solved by the present invention was to generate complemental tooth faces on mating clutch members of this type expeditiously and in a manner to generate the contact faces accurately without employment of difficult and complex means to obtain accuracy of control. The invention consists in a procedure according to which a cutting tool is reciprocated across the tooth bearing rib or zone of the clutch blank toward and away from the axis of the blank, and the location of cutting action is shifted both in an orbit around the axis of the blank and back and forth lengthwise of such axis, the resultant of such displacements of the cutting action being the formation of teeth with lateral faces having the characteristics described.

In carrying out this procedure, the work piece, as a blank disk or previously roughed out piece to be converted into a finished clutch member $a$, is secured to a work spindle $g$. A planing cutter $h$ is secured to a spindle or holder $i$ which is withheld from rotation and is reciprocated radially toward and away from the axis of the work spindle $g$. The spindle or holder $i$ is at a distance from the work piece and the cutter projects toward the work piece with its median line in a radial plane of the work spindle. It is sufficiently narrow at the tip, and its sides converge toward the tip at an angle small enough to enable the cutter to enter deeply into the rib in which teeth are cut and to produce tooth faces with any desired steepness of slope, while at the same time it is wide enough back from the tip to have essential strength and rigidity. Suitable proportions in these respects are indicated by Figs. 5–10. The acting portion of the cutter is the intersection of its under face $k$ with the bounding surface of its tip or extremity.

Figure 8:
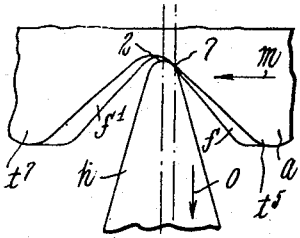
Figure 9:
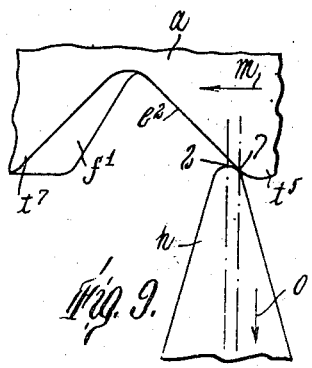

The cutting strokes of the cutter take place in the direction of the arrow $l$, perpendicular to the axis of the work piece. In addition the work piece is rotated about its axis, as indicated by the arrow $m$, and the cutter holder is shifted back and forth in the direction of (parallel to) that axis. Such shifting movements of the cutter holder are timed with the rotation of the work piece to produce a relative resultant oblique movement of the cutter at the inclination prescribed for the axially extending elements of a tooth face, as the face $f'$ of tooth $t^7$, while traveling in the direction of arrow $n$, from a point beside the crest to the root of the tooth (Figs. 5 and 6), and back at the prescribed inclination of the next adjacent tooth face, as the face $f$ of tooth $t^5$, while traveling in the direction of arrow $o$ from root to crest of the latter tooth (Figs. 8 and 9). The further component of motion, cutting travel in the direction of arrow $l$, performed by the cutter many times in the course of each traverse in the directions of arrows $n$ and $o$, causes the cutter to generate helicoidal faces such as those shown at $f$ and $f'$.

When the movements of displacement and rotation are continuous, their timing is suitably correlated with the speed of the cutting strokes to cause sufficient advance or withdrawal, as the case may be, of the cutter in the axial direction during the time required for a cutting stroke, to compensate for the angular displacement of the work piece occurring in the same time. Without such compensation, the cuts taken would be, not truly radial to the work, but tangential to a coaxial circle, of larger or smaller radius depending on the speed of rotation. But the compensating axial displacement causes the surface produced by successive cuts to be a true helicoid with its elements disposed as previously described.

It will be further apparent that the several components of motion may be imparted to the work and cutter in other ways than as above described. Thus the axial reciprocation may be imparted to the work piece; the relative rotational, or angular, displacement between the cutter and work may be effected by revolving the cutter holder around the axis of the work; the cutting may be effected during strokes away from the axis; and the cutting reciprocation may be effected by moving the work piece laterally. The procedure first described is preferable for reasons of practical utility, but all modes of effecting the relative displacement between the cutter and work, of the same nature, are within the scope of this invention.

Cutting tools of other types than planing cutters made of metal are equally useful for this purpose, and in Figs. 11–17 I have shown a grinding wheel $p$ as constituting one such equivalent tool. Other equivalents are milling, shaving and lapping tools of disk form having profiles of like or similar outline to that of the planing cutter. The same relative movements as above described in relation to the planing cutter are caused to take place between the grinding wheel, or other disk-form tool, and work piece, and in addition the wheel or disk is rotated about its axis at an efficient cutting speed.

A further problem is occasioned by the necessity of providing sufficient stock at the cutting extremity of the tool for adequate strength and durability, and to cause sufficient overlapping of successive cuts to generate smooth surfaces with a desirably rapid feed ("feed," in this connection, being the rotary and axial relative displacement between the cutter and work). To supply these requirements, the tool must have appreciable width and a rounded contour symmetrically related to its median line at its cutting portion. The cutting portion in the case of a planing cutter is one bounding edge of the outer end or tip, and in the case of a grinding wheel, or other disk-like tool, is the central zone of its circumference. In profile the circumferential portion of the disk-like tool, like the planing cutter, has a rounded extremity joined to sides which converge toward the extremity at an acute angle. Preferably the curve at the extremity of any such tool is the arc of a circle centered on the median line, although it may be of other character.

If such a tool is moved in cutting so that the middle point of its extremity travels in a path intersecting and perpendicular to the work piece axis, errors result due to the width of the tool and the fact that most of the time the tangent point of the cutter with the work is at one side or the other of its middle point. The nature of these errors is illustrated by Fig. 17, where the grinding wheel form of cutter previously described is shown as in tangent cutting engagement with a work piece at the point 1. The middle point of the cutter is indicated at 2. If the cutter is moved, in cutting, so that its middle point traverses the radius 2—3, its cutting point will follow a line 1—4 which is parallel to the line 2—3 and therefore not radial to the work piece. The character of this error is indicated by the divergence of line 1—4 from the radial line 1—3. Its actual amount depends on the width of the cutter extremity, the diameter of the work piece, and the difference between the inside and outside diameters of the rib in which the teeth are formed.

Figure 10:
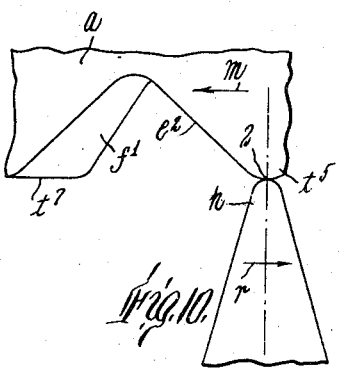

I have devised two ways of eliminating or avoiding such errors. One consists in offsetting the cutter by the amount that the instant tangent or cutting point is separated from the median line, so that the cutting point travels in a radius of the work piece. This is illustrated by Figs. 5–17. No offsetting is needed when the tool acts in the middle of the spaces between two teeth and on the middle of the tooth crests, as shown in Figs. 7, 10 and 12, for then the mid point of the tool is the cutting point. But as the relative feed movements carry the tool away from the middle and along the slope of the crest, the cutting point shifts from the middle point 2 of the cutter through points successively more distant from the middle point, one of which is indicated at 1a in Figs. 13 and 16, until it reaches the location 1, when it is tangent both to the terminal curve of the cutter and to the straight slope of the tooth. By reason of this offsetting, the cutting points 1a, 1, etc. travel in radial lines 1a—3, 1—3, etc. of the work piece, while the mid point of the cutter travels in tangential lines 2—5, 2—6.

Figure 5:
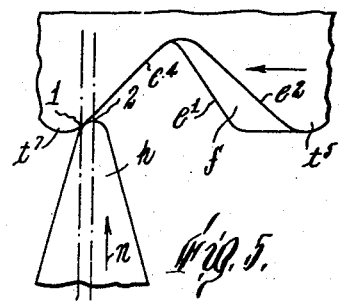
Figure 6:
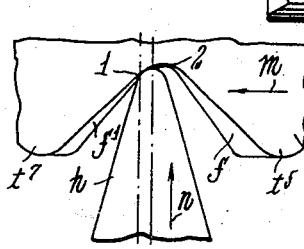
Figure 7:
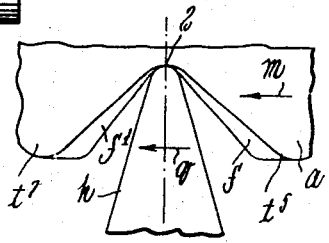

At the end of the feeding step illustrated by Figs. 5 and 6, which brings the cutter to the root of the tooth, the cutter is gradually displaced or offset in the direction of arrow q, while the work rotates in the direction of arrow m and the depth feed displacement is arrested and reversed. The tangent point 7, at the opposite side of the middle point, is then brought to the radial position previously occupied by the point 1, and is reciprocated in that radial plane while the relative feed movements shown by Figs. 8 and 9 take place. Then while the crest of the tooth passes the cutter, the latter is offset in the direction of arrow r to the first position.

Teeth generated in this manner are of uniform height and their surface elements are accurately radial. The two halves or coacting elements of a clutch so made (provided, of course, that their tooth bearing ribs are of equal diameters and cut with equal ratios of rotational and depth feeds) are alike and the teeth of each are complemental to the intermediate spaces of the other. When meshed together their tooth faces make the desired extended surface contact. By varying the speed ratios of the rotary and depth feeds, and varying the extent of the depth feed, the height of the teeth and the inclinations of their sloping faces may be varied within wide limits. This fact is illustrated by comparison of the tooth T shown in Figs. 11–17 with the teeth shown in the preceding figures.

The other of the ways, previously referred to, by which errors are avoided when a tool having appreciable width at the tip is used, consists in effecting the cutting reciprocations in a path at an oblique angle to the axis of the work piece, while the middle point remains in the radial plane. Then the tangent point of the cutter, assuming that it is cutting from the outer to the inner circumference of the tooth rib, crosses the inner circumference at a point further displaced axially of the work than would have been the case if the cutting path were perpendicular to the axis. Thus, referring to Figs. 18–20, which show a work piece mounted with its axis 3—3 at an acute angle to the line A—A (which is perpendicular to the direction of cutting travel), and assuming that the work piece is stationary while the cutter makes a stroke in the direction of arrow l, the tangent point 1 of the cutter, traveling in the path 1—4, parallel to radius 2—3, emerges from the inner circumference $c'$ of the tooth rib at the point 8. If the cutter path were perpendicular to the axis, the emerging point would be the projection of point 8 on the plane perpendicular to the axis which includes the location 1, and would be displaced from the required radial line by an amount measured by the distance between the points 8 and 9 on Fig. 20. But by reason of the inclination of the axis with respect to the cutter path, the point 8 is displaced in the axial direction from that plane. The angle of inclination is set at the degree which causes the point 8 to lie in the bounding edge of a tooth face which has the required radial helicoidal relation to the axis. Relative feed movements of rotation and axial reciprocation are employed here as in the case first described. All other points established by the traverse of the cutting point 1 along the slope of the clutch tooth likewise lie in the required true helicoidal planes. When the opposite side of the tooth space shown in Fig. 19 is brought to the cutter, a tangent point 7 at the opposite side of the median line of the cutter from point 1 correctly generates the face bounding that side. The tooth crests and the fillets at the bottoms of the tooth spaces are generated by the arc of the cutter between points 1 and 7.

The effects above described are more fully shown in Fig. 21. Here as in Fig. 3, $e^2$ and $e^4$ represent the edges of two contiguous teeth in the outer circumference $c^2$, and $e'$ and $e^3$ represent the correct locations, in the inner circumference, $c'$, of teeth having the required helicoidal faces. The dotted lines $e^5$ and $e^6$ represent the incorrect locations, in the inner circumference, of faces cut without correction for the width of the cutter. Inclining of the work axis, to the degree previously indicated, has the effect of displacing the inner edges from the incorrect locations $e^5$ and $e^6$ to the correct locations $e'$ and $e^3$, and proportionally displacing all intermediate points in the tooth faces. Incidentally the tooth crests $s'$ and $s^2$ and the root fillets $u$ are equally displaced in the same manner, so that they are higher at the inner circumference with respect to planes perpendicular to the axis, than at the outer circumference, although their height from root to crest is uniform. This condition shortens the depth of mesh between complemental teeth at the outer circumference, and therefore imposes limitations which do not affect the procedure first described. In other words, cutters wider at the tip may be used under the first described procedure than under the second. But within its limitations, the second procedure is equally effective to avoid errors of tooth form due to the width of the cutter.

The illustrative diagrams contained in these drawings represent the conditions when the finishing cut is being taken. The method here disclosed is applicable both for generating to finished form teeth in an initially uncut blank, in any desired number of cutting operations, and for finishing teeth roughed out in other ways.

What I claim and desire to secure by Letters Patent is:

1. The method of generating face clutch teeth with radial helicoidal side faces, which consists in effecting relative reciprocation between a cutter and a face clutch blank axially of the blank, effecting relative rotary movement around the axis of the blank with a timed relation between said movements such that the resultant thereof is the generation of a succession of connected sloping lines of alternately opposite inclination in a circumference of the blank, effecting repeated cutting traverses between the tool and clutch blank in a path perpendicular to the axis of the blank, and offsetting the cutting extremity of the cutter to bring tangent points at opposite sides of its median line alternately in a path intersecting and perpendicular to said axis.

2. The method of generating face clutch teeth with radial helicoidal side faces, which consists in locating a cutting tool having a rounded cutting extremity in position to perform a cutting action on one face of a clutch blank, effecting relative movements between such cutting tool and blank progressively along successive radii of the blank, effecting relative movement between the tool and blank in the directon of the axis of the blank in timed relation such that successive cuts generate contiguous sloping surfaces of alternately opposite inclination in the clutch blank, and alternately shifting the tool from side to side at the conclusion of each such relative axial movement in first one and then the opposite direction to bring cutting points on opposite sides of the cutting extremity into substantially exact radial perpendicular alinement with the said axis.

3. The method of generating face clutch teeth with radial helicoidal side faces, which consists in bringing a tool, having a cutting extremity of appreciable width and rounded outline in profile and sides making an angle with each other smaller than the angle between the side faces of adjacent teeth of the clutch, into relation with one end of a clutch blank such that relative movement between the tool and blank effects engagement between a tangent point of such extremity and the blank, effecting relative cutting traverse between the tool and blank in a path intersecting and inclined at an oblique angle, to the axis of the blank, and effecting correlated movements of relative rotation about said axis and relative reciprocation in the direction of said axis at rates suitably correlated with the first mentioned reciprocation to generate helicoidal surfaces of which the elements lying in planes perpendicular to the axis are radial lines and the axially extending elements are inclined to such planes.

NEAL L. COBB.

REFERENCES CITED

The following references are of record in the file of this patent:

UNITED STATES PATENTS

| Number | Name | Date |
| --- | --- | --- |
| 497,997 | Wilkin | May 23, 1893 |
| 709,235 | Monneret | Sept. 16, 1902 |
| 982,581 | Fellows | Jan. 24, 1911 |
| 1,957,028 | Maurer | May 1, 1934 |